US008626200B2

(12) United States Patent
Shaw et al.

(10) Patent No.: US 8,626,200 B2
(45) Date of Patent: Jan. 7, 2014

(54) NETWORK SYSTEMS AND METHODS UTILIZING MOBILE DEVICES TO ENHANCE CONSUMER EXPERIENCE

(75) Inventors: Venson Shaw, Kirkland, WA (US); DeWayne Sennett, Redmond, WA (US); Brian K. Daly, Seattle, WA (US); Robert Evora, Douglasville, GA (US); Coulter Henry, Jr., Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/559,650

(22) Filed: Jul. 27, 2012

(65) Prior Publication Data

US 2012/0293305 A1 Nov. 22, 2012

Related U.S. Application Data

(60) Continuation of application No. 12/504,057, filed on Jul. 16, 2009, now Pat. No. 8,254,881, which is a division of application No. 11/874,660, filed on Oct. 18, 2007, now Pat. No. 7,580,699.

(51) Int. Cl.
*H04W 4/00* (2009.01)

(52) U.S. Cl.
USPC ............... 455/456.3; 455/456.6; 455/456.1; 701/412

(58) Field of Classification Search
USPC ................ 455/456.3, 456, 6, 456.1; 701/412; 235/380
See application file for complete search history.

(56) References Cited

U.S. PATENT DOCUMENTS

| 6,047,270 | A | 4/2000 | Joao et al. |
| 6,123,259 | A * | 9/2000 | Ogasawara .................. 235/380 |
| 6,587,835 | B1 | 7/2003 | Treyz |
| 7,499,799 | B2 * | 3/2009 | Park ............................. 701/412 |
| 7,865,308 | B2 * | 1/2011 | Athsani et al. ................ 701/457 |
| 2002/0053082 | A1 | 5/2002 | Weaver et al. |
| 2003/0027581 | A1 | 2/2003 | Jokinen et al. |
| 2003/0043183 | A1 | 3/2003 | Sakakibara et al. |
| 2004/0185825 | A1 | 9/2004 | Preiss et al. |
| 2005/0193037 | A1 | 9/2005 | Adiba et al. |
| 2006/0131385 | A1 | 6/2006 | Kim |
| 2006/0131390 | A1 | 6/2006 | Kim |
| 2008/0045238 | A1 * | 2/2008 | Zhou et al. ................ 455/456.1 |
| 2008/0140507 | A1 | 6/2008 | Hamlisch et al. |
| 2008/0298230 | A1 | 12/2008 | Luft et al. |

* cited by examiner

*Primary Examiner* — Danh Le

(74) *Attorney, Agent, or Firm* — Hartman & Citrin LLC

(57) ABSTRACT

A mobile device requests map information to locate an item in a store. If the item is available, map information is sent to the mobile device. The map information includes directions to the item. If the item is not available, alternative item information is sent to the mobile device.

18 Claims, 15 Drawing Sheets

NETWORK SYSTEMS AND METHODS UTILIZING MOBILE DEVICES TO ENHANCE CONSUMER EXPERIENCE

CROSS REFERENCE TO RELATED APPLICATION

This application is a continuation of U.S. application Ser. No. 12/504,057, filed Jul. 16, 2009 (now U.S. Pat. No. 8,254,881) which is a divisional of U.S. application Ser. No. 11/874,660, filed Oct. 18, 2007 (now U.S. Pat. No. 7,580,699), which are herein incorporated by reference in their entirety.

TECHNICAL FIELD

The present invention relates generally to network systems and methods and, more particularly, to network systems and methods for utilizing mobile devices to enhance customer experience.

BACKGROUND

Many businesses offer membership programs. Some membership programs offer access to a store for the purchase of goods and services. This is common in membership warehouse stores. Other membership programs offer discounts on items for members. Yet other programs allow members to participate in incentive programs. Some membership programs are free while others require a one-time fee, a monthly fee, or a yearly fee.

Regardless of the type of membership program, a prospective member is often required to fill out a membership application prior to receiving an identification card with the member's membership information. The member can then pursue the benefits of the membership program.

Current membership programs rely on the identification cards as authentication of a customer's member status and to grant the customer access to the store, store discounts, and other membership benefits. This is undesirable to the customer due to the inconvenience having to carry the card. In the event the card is lost or stolen, there is little the customer can do to retrieve the card or at least prevent another person from gaining access to the membership benefits granted by the card. The store can issue another card but there is no tracking information associated with the member card as there is with a consumer credit card.

Many customers use written, typed, or mental lists as a reminder of items needed when going to a store. Electronic devices, such as PDAs and smart phones, now offer word processing programs that facilitate the creation of a shopping list. When the customer enters a store, it is the customer's responsibility to remember the list and find each item on the list. Stores are typically designed such that the items are logically arranged; however, it is impossible to arrange the items to satisfy each customer's needs.

Subtle changes, such as end cap changes, promotional rearrangements, and the like, can be confusing to the customer in trying to find an item that has been moved due to one of these changes. Currently, there are no systems that provide list and mapping functions on a mobile device in order to better serve the customer in finding each item.

When a customer desires to purchase an item, the customer can use a check-out terminal operated by a store associate or a self check-out terminal for performing the check-out functions. The customer is often provided multiple payment options for purchasing the item including cash, credit card, debit card, check, gift certificate, gift card, traveler's checks, or government credits. These methods all require the customer to carry cash on hand, checks, or a number of cards for the varying payment methods.

The aforementioned art includes deficiencies that are overcome by the new systems and novel methods disclosed herein. The applicant desires to create a need and market for these new systems and novel methods that provide the following functions on a mobile device: membership program functions; list functions; item in-store mapping functions; item search functions; and remote charging functions using a mobile device or using a service provider account.

SUMMARY OF THE INVENTION

One aspect of the present invention is a method for providing and accessing membership accounts via a mobile device. The method includes sending a member identification request to a mobile device upon the mobile device being detected by a network. If a member identification is stored in a memory of the mobile device, the mobile device generates and sends a member identification response including the member identification. Upon receipt of the member identification, the member identification is authenticated and the mobile device user is authorized to access a membership account associated with the member identification. If, however, no member identification is stored in the memory of the mobile device, the mobile device generates and sends a new member identification request requesting that a new member identification be issued for the requesting customer. Upon receipt of the new member identification request, a new member identification is generated and sent to the mobile device for storage in the mobile device memory. The mobile device user is then authorized to access a membership account associated with the new member identification.

In one embodiment of the aforementioned method the network is an IEEE 802.11x wireless network. In another embodiment the network is a short range wireless communications network.

Another aspect of the present invention is a method for redeeming coupons via a mobile device. The method includes initiating a transaction between a mobile device and a check-out terminal; receiving a coupon at a check-out terminal from the mobile device; authenticating the coupon; applying the discount associated with the coupon upon authentication; and completing the transaction.

Yet another aspect of the present invention is a method for providing an item map on a mobile device. The method includes receiving a request to map at least one item from a mobile device; retrieving map information associated with the item(s); and sending the map information to the mobile device.

In one embodiment of the aforementioned method, the map information includes a base map and a data point for the item(s). In another embodiment, the map information is a custom map with a position established for the item(s). In yet another embodiment, the map information includes directions to the item(s). The directions can be generated from a present location of a user of the mobile device. In still another embodiment, the map information includes a map version of a map stored in a memory of the mobile device. In one embodiment the item(s) is acquired from an item list and in another embodiment the item is acquired in an item search request received from the device.

Another aspect of the present invention is a method for providing item search functions on a mobile device. The method includes receiving a search request for an item from a mobile device at an inventory server; determining the availability of the item; and sending an availability status of the item to the mobile device.

In one embodiment, the aforementioned method further includes retrieving map information from a map database if the item is available and sending the map information to the mobile device.

In another embodiment, the aforementioned method further includes determining alternative item information for the item if the item is not available and sending the alternative item information to the mobile device.

Another aspect of the present invention is a method for charging a remote account for goods and services. The method includes establishing a connection between a remote account provider and a transaction interface to facilitate a remote charging transaction; receiving a customer identification at the remote account provider; authorizing the customer identification, if the customer identification corresponds to a remote account authorized to accept remote charging transaction charges; receiving a charge request including charge details for a transaction between a customer and the transaction interface; charging the remote account according to the charge details; and sending a charge response to the transaction interface identifying the success or failure of the charge request.

In one embodiment of the aforementioned method, the remote account provider is a wireless service provider and the remote account is a wireless service account.

In another embodiment of the aforementioned method, the transaction interface is a check-out terminal. In another embodiment the transaction interface is a web check-out interface.

In yet another embodiment of the aforementioned method, the customer identification is assigned to the customer by the remote account provider. In another embodiment, the customer identification is a telephone number. In yet another embodiment the customer identification is chosen by the customer. In still another embodiment the customer identification is assigned to the customer by a membership program.

DETAILED DESCRIPTION OF THE INVENTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
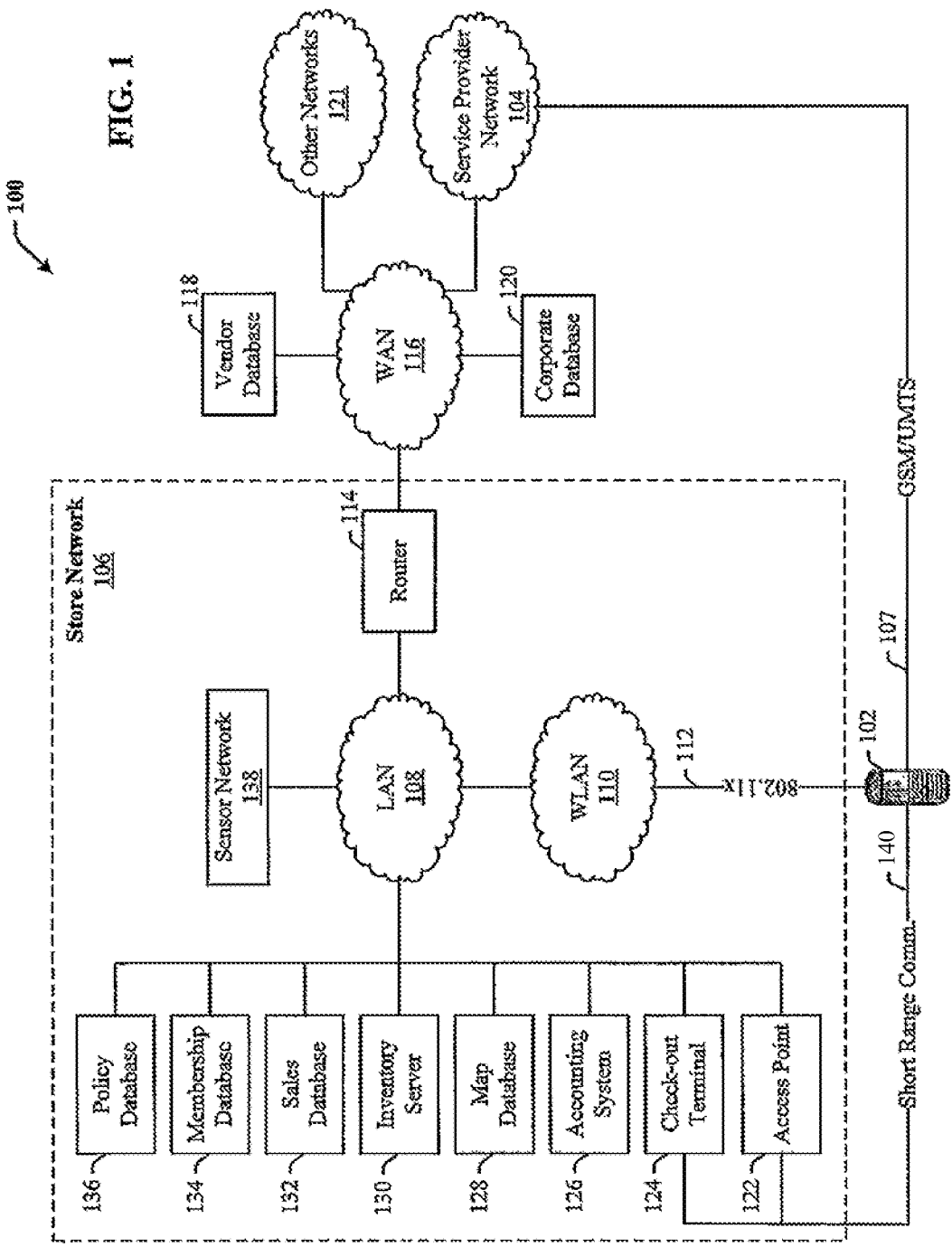
FIG. 1 is a block diagram illustrating an exemplary communications network in accordance with an embodiment of the present invention.

Referring now to the drawings wherein like numerals represent like elements throughout the several views, FIG. 1 is a block diagram illustrating an exemplary communications network 100 in accordance with an embodiment of the present invention. The illustrated communications network 100 includes a mobile device 102 that is in communication with a service provider network 104 and a store network 106. The mobile device 102 can be a personal digital assistant (PDA), a cellular telephone, a smart phone, a messaging device, a mobile game device, any combination thereof, and the like. The illustrated embodiment assumes that the mobile device 102 is capable of communication with a wireless service provider (e.g., service provider 104) via a GSM (Global System for Mobile communications) and/or UMTS (Universal Mobile Telecommunications System) link 107.

Although applicable to any existing or yet to be developed wireless telecommunications network, aspects of the disclosed architecture can be implemented using GSM that uses general packet radio service (GPRS) as an enabling bearer. Examples of other suitable wireless and radio frequency data transmission systems include networks utilizing frequency division multiple access (FDMA), time division multiple access (TDMA), code division multiple access (CDMA), wideband CDMA (WCDMA), orthogonal frequency division multiplexing (OFDM), and various other 2.5G, 3G (third generation) and further generation wireless communications systems. Examples of other suitable enabling bearers include UMTS, enhanced data rates for global evolution (EDGE), high speed downlink packet access (HSDPA), high speed uplink packet access (HSUPA), high speed OFDM packet access (HSOPA), evolution data optimized (EVDO), and similar communications protocols.

The service provider network 104 can provide various telecommunications services including but not limited to wireless voice service and data service (e.g., Internet access, email, and messaging). These services can be provided in prepaid or postpaid service plans. A prepaid plan allows a customer to pay for services prior to using them. After the customer has used the prepaid amount of voice minutes, data transfer (e.g., per kilobyte), or messages (e.g., text messages or multimedia messages), the customer is unable to use further services prior to replenishing the account. A postpaid plan, however, allows a customer to subscribe to a service plan at a fixed cost for a specified amount of voice minutes, data transfer, and/or messages, and is due at a specified interval (e.g., monthly). Should the customer exceed the specified amount of voice minutes, data transfer, and/or messages the customer is charged an overage fee for service levels exceeding those specified in the service plan. Postpaid customers are also typically provided add-on options for data, messages, or special services. As will be described herein, various aspects of the present invention can be tracked by a service provider and charged to a customer as a special service that may or may not entail additional cost. The service provider network 104 can include appropriate billing systems and supporting systems and subsystems (not shown) to enable proper tracking and billing for services rendered to customers.

The illustrated store network 106 includes a local area network (LAN) 108 that provides wireline network communications among various store network components and customer devices, such as a customer mobile device 102. A wireless LAN (WLAN) 110 is also provided for IEEE 802.11x wireless communications among the store network components and/or the customer mobile device 102. Although illustrated as separate elements, the LAN 108 will often be referred to as combining both the wireline LAN and wireless LAN components.

The LAN 108 provides access to a wide area network (WAN) 116 via a router 114. The WAN 116 can be a corporate or private WAN. The WAN 116 is in communication with one or more vendor databases 118 and corporate databases 120. The vendor database(s) 118 can be configured to store and manage vendor information, such as vendor name, address, telephone number, email, contact names, vendor account numbers, customer account numbers, and the like. The corporate database(s) 120 can be configured to store and manage corporate data, such as store data, associate data, accounting data, and the like. The WAN 116 is also in communication with other networks 121. Other networks 121 can include the Internet, an intranet, and an extranet.

The illustrated store network 106 includes an access point 122 that is in communication with the mobile device 102 via a short range communications medium 140, such as, but not limited to, BLUETOOTH, RFID, IR, IRDA, near-field communications (NFC), other RF communications, other line of sight communications, and the like. An access point 122 can be in communication with the mobile device 102 to provide membership account access, digital coupons, store maps, product information, and the like to a customer. An access point 122 can also be configured for 802.11x connectivity in support of the WLAN 110 to increase connection strength and range. An access point 122 can be in communication with a check-out terminal 124 via the LAN 108, wirelessly via the WLAN 110, or via a short range communications medium to allow communication between the mobile device 102 and the check-out terminal 124. An access point 122 can be built-in to the check-out terminal 124.

The check-out terminal 124 can provide typical check-out functions, such as scanning items, weighing items, calculating item totals, calculating pretax cost, calculating post tax cost, calculating money saved, and verifying coupons. Multiple access points can be installed throughout the store network 106 to provide various functions as described herein below.

The illustrated store network 106 also includes an accounting system 126, a map database 128, an inventory server 130, a sales database 132, a membership database 134, and a policy database 136. While other elements are possible and are in fact, contemplated, they are not illustrated in order to simplify the description of FIG. 1.

The accounting system 126 provides accounting services for the store network 106. Accounting services can include, for example, establishing periodic (e.g., daily, monthly, yearly) sales goals, managing store income and store expenses, managing payroll (if delegated at the store level), managing tills, and other accounting services.

The map database 128 can be configured to store and manage store maps. A store map can be updated for promotions, store layout changes, end cap changes, sales, and the like, and stored in the map database 128. The map database 128 can store any number of maps. For example, multiple versions of a base store map can be generated and stored. The corporate database 120 can provide base maps, updated maps, and/or base map updates for a particular store based on the store location, current sales, promotions, etc.

Figure 9:
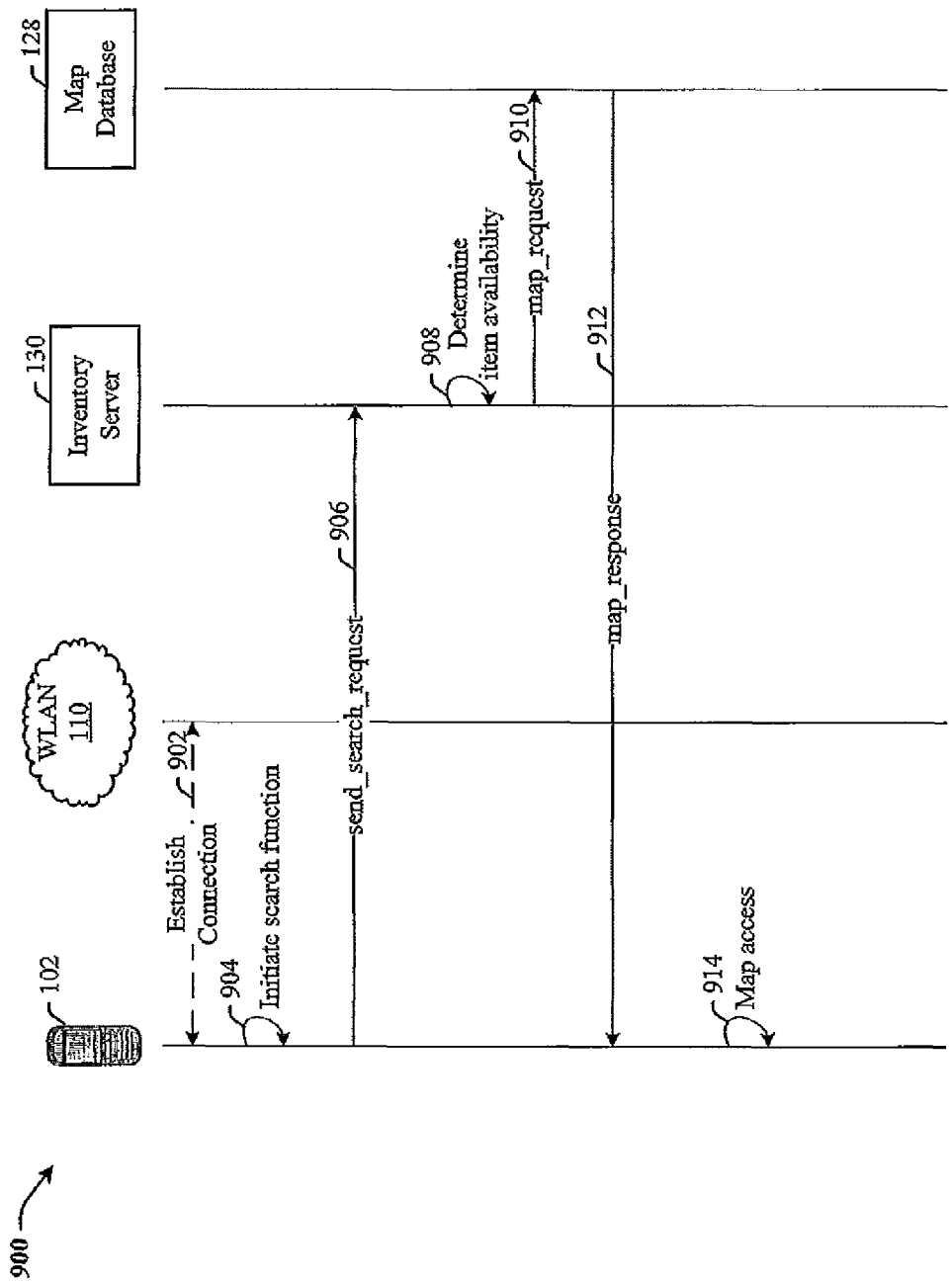
FIG. 9 is a message flow diagram illustrating a product search process in accordance with an embodiment of the present invention.

The inventory server 130 can be configured to store and manage inventory status for the store. As items are purchased, the inventory status is updated. Low stock items can be reordered as necessary. The inventory database can also provide real-time or near real-time inventory status for a plurality of items searchable via the mobile device 102. An exemplary search process is illustrated in FIG. 9.

The sales database 132 can be configured to store and manage sale items, promotions, store coupons, and eligible manufacture coupons for the store. The sales database 132 can be updated periodically by the corporate database 120, or manually by a store associate.

The membership database 134 can be configured to store and manage store membership program information for store members. Memberships can be store specific, franchise specific, chain specific, city specific, state specific, region specific, or customer specific, for example. Memberships can be provided free or for a cost specified by the store owner. The corporate database 120 can provide membership access specifications on a per customer basis. This information can be updated in the local membership database 134 for each applicable store.

The policy database 136 can be configured to store and manage membership policies for each customer. Policies can be global, group specific, store specific, franchise specific, chain specific, city specific, state specific, region specific, or customer specific, for example.

A sensor network 138 is illustrated. In one embodiment, the sensor network 138 is designed to be integrated into the store shelves and other item displays. When a customer removes an item from a shelf, a sensor is triggered to notify the inventory server 130 that an item has been removed. The inventory server 130 can maintain a status for items that have been removed from a shelf. This can provide associates with information regarding which items need to be restocked even prior to the items actually being sold. Further, items that are incorrectly placed on a shelf can be flagged and reported to the inventory server 130 and the item can be appropriately shelved. The inventory server 130 can also communicate with the membership database 134 to build a pre-checkout list corresponding to the items removed from the shelves by a particular customer. It is contemplated that the customer's mobile device 102 can be in communication with the server network 138 to establish that a particular item has been removed. When the customer desires to check-out, any pre-checkout list can be sent to the check-out terminal 124 and the items can be purchased.

The sensor network 138 can also include sensors configured in the shopping carts and shopping baskets in the store. These sensors can be stand-alone and any item movement can be recorded as entering and exiting the shopping cart/basket and updated in the inventory server and/or maintained in a pre-checkout list. These sensors can also be coupled with those installed in the store shelves and other item displays to confirm that an item removed from a shelf has been placed in the position of a customer and that the customer, at least for the time being, desires to purchase the item. Accordingly, a pre-checkout list can be generated for items placed in the shopping cart/basket.

The sensor network 138 can include radio frequency identification (RFID) sensors, such as RFID readers to read RFID tags attached to items. The sensor network 138 can alternatively include bar code scanner, near field communications (NFC), BLUETOOTH receivers and transmitters, scales, and the like to coordinate the status of items throughout the store.

Although a single store network 106 is illustrated, it is contemplated that a group of stores, for example, a franchise or a chain, can be interconnected via the illustrated WAN 116.

Figure 2:
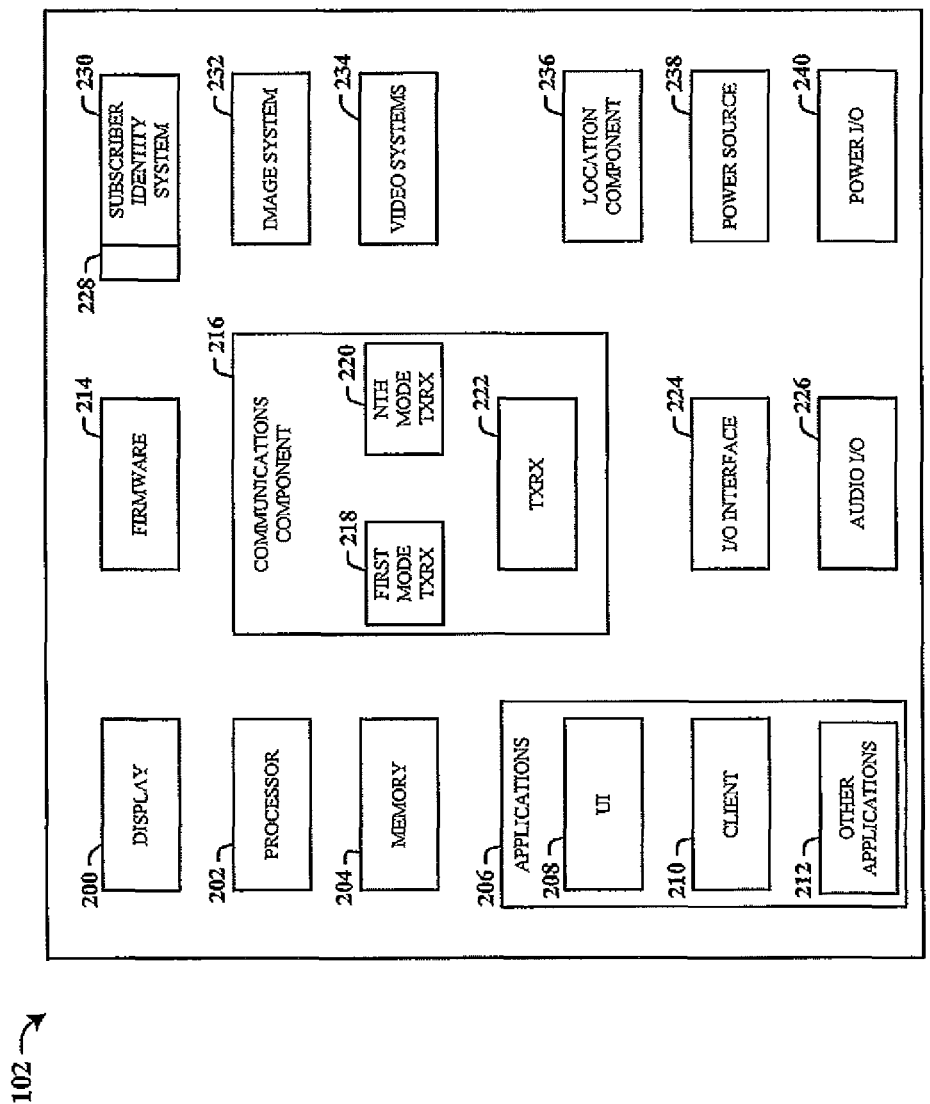
FIG. 2 is a block diagram illustrating various components of an exemplary mobile device in accordance with an embodiment of the present invention.

Referring now to FIG. 2, a block diagram illustrating various components of an exemplary mobile device 102 is shown, according to the present invention. Although no connections are shown between the components illustrated and described in FIG. 2, the components can interact with each other to carry out device functions.

As illustrated, the mobile device 102 can be a multi-mode handset. FIG. 2 and the following discussion are intended to provide a brief, general description of a suitable environment in which the various aspects of an embodiment of the present invention can be implemented. While the description includes a general context of computer-executable instructions, the present invention can also be implemented in combination with other program modules and/or as a combination of hardware and software. Particular processes carried out by the mobile device 102 and components in communication with the mobile device 102 are described in greater detail with reference to the remaining figures described herein. These processes can be carried out via applications stored within a memory on the mobile device 102.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 102 includes a display 200 for displaying multimedia such as, for example, text, images, video, telephony functions, visual voicemail data, caller line ID data, setup functions, menus, music metadata, messages, wallpaper, graphics, store map data, item lists, and the like. The device 102 also includes a processor 202 for controlling and/or processing data. A memory 204 can interface with the processor 202 for the storage of data and/or applications 206. The memory 204 can include a variety of computer readable media including, but not limited to, volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD-ROM, DVD, or other optical disk storage, magnetic tape, magnetic disk storage, other magnetic storage devices, or any other medium that can be used to store the desired information and that can be accessed by the device 102.

The memory 204 can be configured to store one or more applications 206, such as, for example, store-specific software, map software, list software, coupon redemption software, video player software, user feedback component software (e.g., courtesy feedback, complaint feedback, product reviews/comments), combinations thereof, and the like. The applications 206 can also include a user interface (UI) application 208. The UI application 208 can interface with a client 210 (e.g., an operating system) to facilitate user interaction with device functionality and data, for example, answering/initiating calls, entering/deleting data, configuring settings, address book manipulation, multi-mode interaction, map interaction, search interaction, and the like. The applications 206 can include other applications 212 such as, for example, visual voicemail software, add-ons, plug-ins, voice recognition software, call voice processing, voice recording, messaging, e-mail processing, video processing, image processing, music play, combinations thereof, and the like, as well as subsystems and/or components. The applications 206 can be stored in the memory 204 and/or in a firmware 214, and can be executed by the processor 202. The firmware 214 can also store code for execution during initialization of the device 102.

A communications component 216 can interface with the processor 202 to facilitate wired/wireless communications with external systems including, for example, cellular networks, VoIP networks, LAN, WAN, MAN, PAN, that can be implemented using WWI, WIMAX, combinations and/or improvements thereof, and the like. The communications component 216 can also include a multi-mode communications subsystem for providing cellular communications via different cellular technologies. For example, a first cellular transceiver 218 can operate in one mode, for example, GSM, and an Nth transceiver 220 can operate in a different mode, for example WIFI. While only two transceivers 218, 220 are illustrated, it should be appreciated that a plurality of transceivers can be included. The communications component 216 can also include a transceiver 222 for unlicensed RF communications using technology such as, for example, WIFI, WIMAX, near-field communications (NFC), other RF and the like. The transceiver 222 can also be configured for line-of-sight technologies, such as, infrared and IRDA, for example. Although a single transceiver 222 is illustrated, multiple transceivers for unlicensed RF and line-of-sight technologies are contemplated.

The communications component 216 can also facilitate communications reception from terrestrial radio networks, digital satellite radio networks, Internet-based radio services networks, combinations thereof, and the like. The communications component 216 can process data from a network, such as, for example, the Internet, a corporate WAN, an intranet, a home broadband network, and the like, via an ISP, DSL provider, or other broadband service provider.

An input/output (I/O) interface 224 can be provided for input/output of data and/or signals. The I/O interface 224 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 226 that can include a speaker (not shown) for the output of audio signals and a microphone (not shown) to collect audio signals.

The device 102 can include a slot interface 228 for accommodating a subscriber identity system 230, such as, for example, a SIM or universal SIM (USIM). The subscriber identity system 230 instead can be manufactured into the device 102, thereby obviating the need for a slot interface 228.

The device 102 can include an image capture and processing system 232. Photos and/or videos can be obtained via an associated image capture subsystem of the image system 232, for example, a camera. The device 102 can also include a video systems component 234 for processing, recording, and/or transmitting video content.

A location component 236 can be included to send and/or receive signals, such as, for example, GPS data, assisted GPS data, triangulation data, combinations thereof; and the like. The device 102 can use the received data to identify its location or can transmit data used by other devices to determine the device 102 location. For example, when a customer enters a store with the mobile device 102, the location component 236 can communicate with various sensors within the store to determine the customer's position. The customer's position can then be displayed in or on a map on the display 200.

The device 102 can include a power source 238 such as batteries and/or other power subsystem (AC or DC). The power source 238 can be single-use, continuous, or rechargeable. In the case of the latter, the power source 238 can interface with an external power system or charging equipment via a power I/O component 240.

Figure 3:
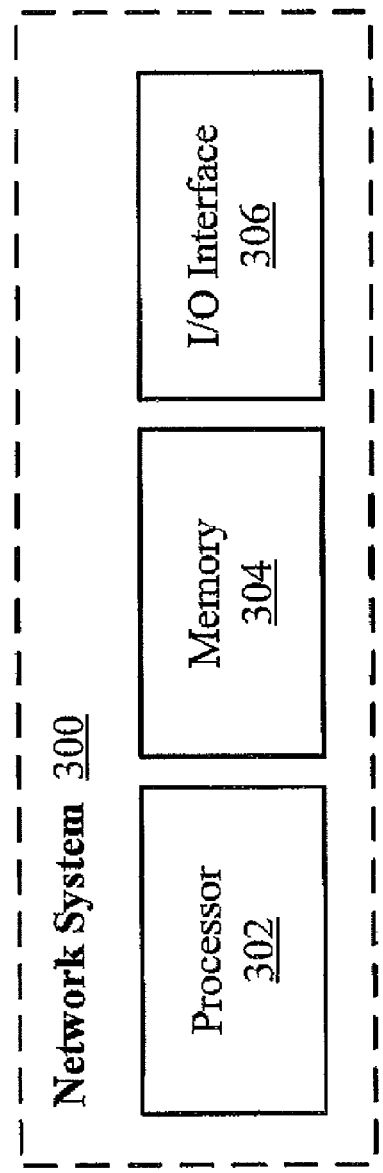
FIG. 3 is a block diagram illustrating various components of an exemplary network system in accordance with an embodiment of the present invention.

Referring now to FIG. 3, a block diagram illustrating various components of an exemplary network system 300 is shown, according to the present invention. Although no connections are shown between the components illustrated and described in FIG. 3, the components can interact with each other to carry out network system functions. The network system 300 is intended to be exemplary of any of the systems, servers, databases, and devices described previously with reference to FIG. 1.

The illustrated network system 300 includes a processor 302 for controlling and/or processing data. A memory 304 interfaces with the processor 302 for the storage of data and/or applications. The memory 304 can include a variety of computer readable media including but not limited to volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD-ROM, DVD, or other optical disk storage, magnetic tape, magnetic disk storage, other magnetic storage devices, or any other medium that can be used to store the desired information and that can be accessed by the network system 300.

The illustrated network system 300 also includes an I/O interface 306. The I/O interface 306 can be provided for input/output of data and/or signals. The I/O interface 306 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a bar code scanner, a scale, a keyboard, keypad, mouse, interface tether, stylus pen, printer, plotter, jump/thumb drive, touch screen, touch pad, trackball, joy stick, controller, monitor, display, LCD, combinations thereof, and the like. The I/O interface 306 can also provide transceiver functionality for wireless devices via short range communications and/or IEEE 802.11x.

Figure 4:
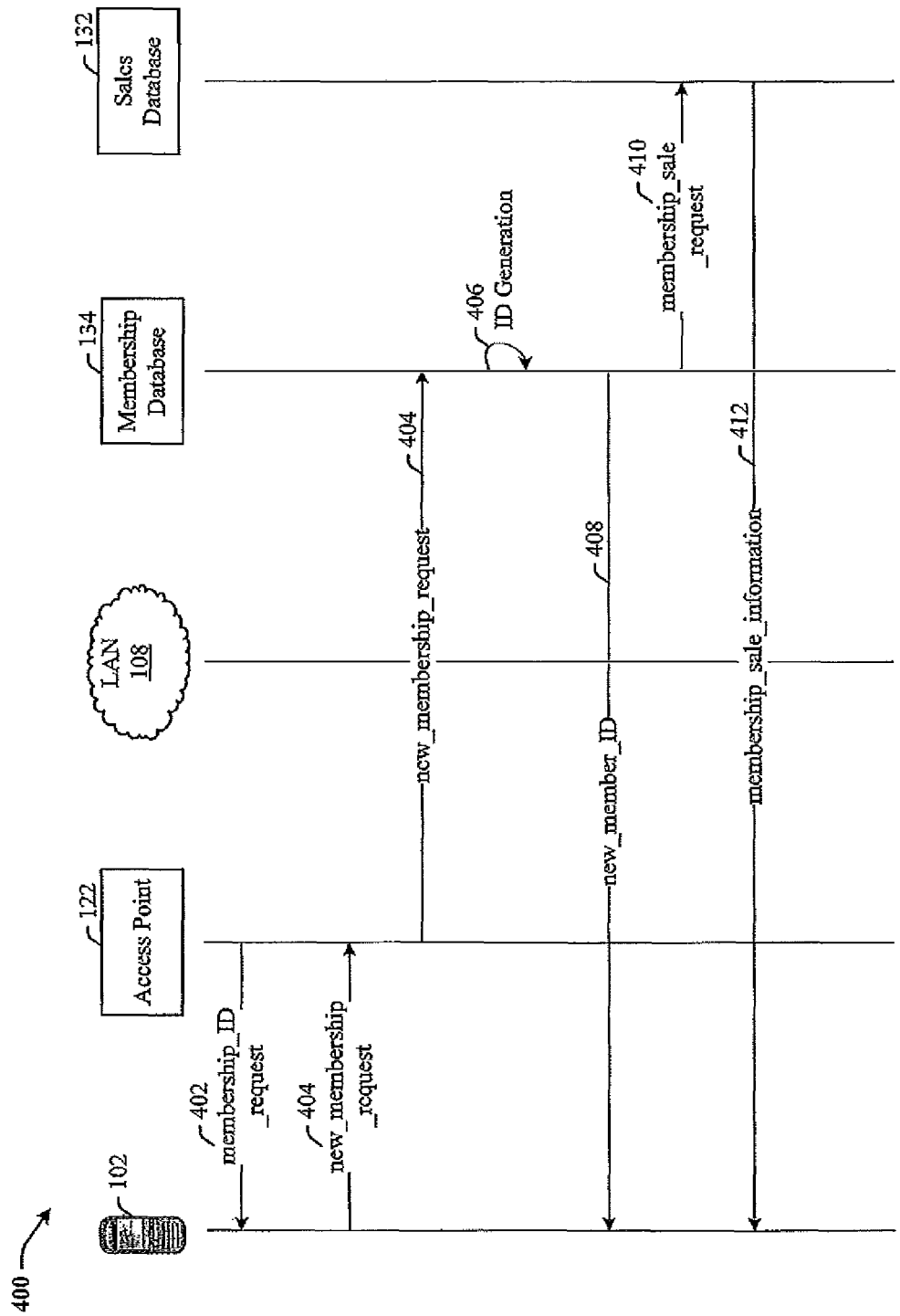
FIG. 4 is a message flow diagram illustrating a new membership registration process in accordance with an embodiment of the present invention.

Referring now to FIG. 4, a message flow diagram illustrating a new membership registration process 400 in accordance with the present invention is shown. It should be understood that the illustrated processes are not limited to the steps shown nor the order of the steps shown and are provided solely as a basis for teaching an exemplary embodiment of the present invention. Accordingly, amendments to this method and/or the addition, elimination, or combination of one or more steps may be made to achieve like results and still be within the scope of the present invention.

The following processes can be implemented as a computer application that includes routines, programs, components, data structures, etc. that perform particular tasks or implement particular abstract data types. Moreover, the inventive processes can be practiced with processor and memory configurations, including single-processor or multi-processor systems, minicomputers, mainframe computers, as well as personal computers, hand-held computing devices, microprocessor-based or programmable consumer electronics, and the like, each of which can be operatively coupled to one or more associated devices.

The new membership process 400 enables a customer to establish a membership account with a store via a mobile device 102. The new membership registration process 400 begins when the mobile device 102 interacts with an access point 122. The access point 122 can provide connectivity via wireline or wireless communication mediums via 802.11x or a short communications medium as described above. In one embodiment, the mobile device 102 is connected to the access point 122 via a USE, IEEE 1394, Ethernet, or other wireline connection directly, or via a cradle apparatus. In another embodiment, the mobile device 102 is in communication with the access point 122 wirelessly via a short range communications medium or via 802.11x. In either case, the access point 122 can generate and send a membership_ID_request message 402 to the mobile device 102. The membership_ID_request message 402 can prompt the customer to enter a member ID to access the store network 106 and the customer's membership account. In implementations that require security, a password, PIN, token, pass phrase, voice recognition, fingerprint recognition, retinal scan, security question(s), combinations thereof, and/or other security mechanisms known in the art can be used to limit access to authorized customers.

In the illustrated process 400, the customer does not have a membership_ID and accordingly can select a new membership button presented with the prompt. When a new_membership button is selected, a new_membership_request 404 can be generated and sent to the access point 122 to request a new membership account for the customer. The customer can be required to enter any combination of identifying information including, but not limited to name, address, telephone number, email address, date of birth, social security number, security question answer, and customer-created password. Any combination of the aforementioned identifying information can be appended to the new_membership_request 404 to aid in establishing a new membership account for the specified customer. Security measures may be enacted at a store network 106, a mobile device 102, or both to prevent theft of a user's personal information or requests for personal information from unauthorized users. The new_membership_request 404 is received at the access point 122 and forwarded to the membership database 134 via the LAN 108 or WLAN 110 (not shown).

Upon receipt of a new_membership_request 404 at the membership database 134, a member ID is generated for the customer at step 406. In one embodiment, a member ID is generated from a portion of the supplied identifying information. In another embodiment, a member ID is generated for the member randomly, pseudo-randomly, or based on pre-defined list of member IDs. A member ID can also be selected by a customer and approved of prior to entry in the membership database 134. Although not illustrated, the membership database 134 can communicate with the corporate database 120 to manage a corporate level membership database. After the member ID is generated at step 406, the membership database 134 can generate a new_member_ID message 408 and send the new_member_ID message 408 to the mobile device 102. The customer is now capable of signing in as a returning member with the newly acquired member ID. A message flow diagram illustrating a current member sign-in process 500 is shown FIG. 5.

In an optional step, as shown in the illustrated embodiment, the membership database 134 can automatically generate and send a membership_sales_request message 410 to the sales database 132. A membership_sales_request message 410 can request any sales information currently available that is applicable for the customer. For example, available sales information can include daily, weekly, monthly, yearly, seasonal, holiday, promotional, individual store sales, clearance, red tag, member specific, member group specific, membership level specific sales information, and the like. The sales database 132 can generate and send a membership_sale_information message 412 to the mobile device 102. The membership_sale_information message 412 can include the applicable sale information for the new member.

A membership account can be device agnostic or can be associated with one or more devices. For example, a customer may have multiple mobile devices each of which require membership access. Accordingly, the customer can provide specific device information for the devices authorized to access the customer's account if the appropriate member ID and optional security information (e.g., password) is provided. The device information can be the device manufacturer, IP address, telephone number, device type, device model, device model version, device serial number, or other unique device identifier, for example. A wireless service subscriber can provide an IMSI (International Mobile Subscriber Identity) or a specific TMSI (Temporary Mobile Subscriber Identity) to establish authorized access to the customer's membership account.

The customer can also designate a plurality of authorized users to the customer's membership account. Authorized users, such as friends or family, can be required to supply corresponding identifying information—personal, device, or otherwise—as required by the store and/or the customer.

Figure 5:
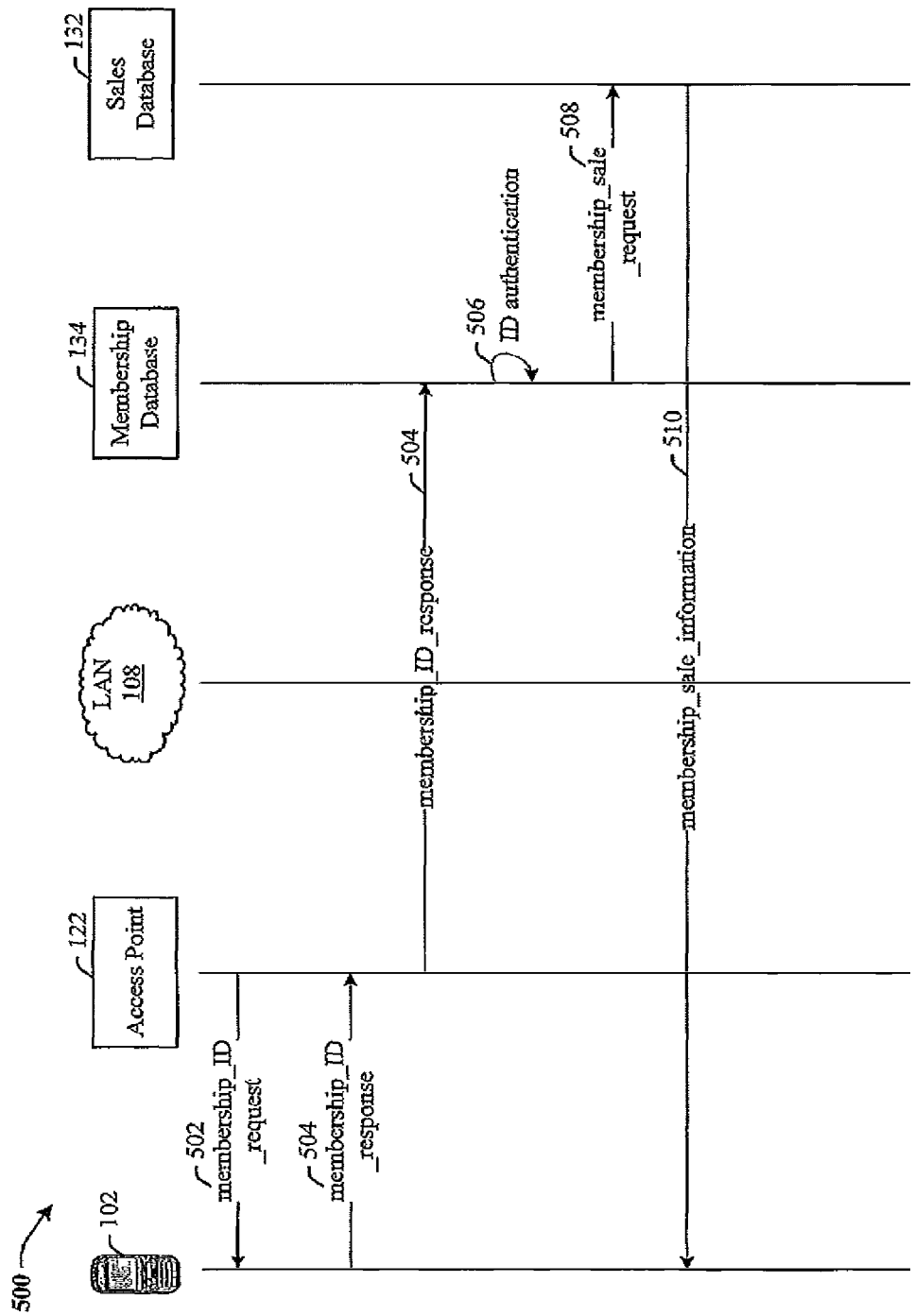
FIG. 5 is a message flow diagram illustrating a current member sign-in process in accordance with an embodiment of the present invention.

Referring now to FIG. 5, a message flow diagram illustrating a current member sign-in process 500 is shown, according to the present invention. The current member sign-in process 500 enables a customer to sign-in to a membership account with a store via a mobile device 102. The current member sign-in process 500 begins when the mobile device 102 interacts with an access point 122. The access point 122 can provide connectivity via wireline or wireless communication mediums via 802.11x or a short communications medium as described above. In one embodiment, the mobile device 102 is connected to the access point 122 via a USB, IEEE 1394, Ethernet, or other wireline connection directly or via a cradle apparatus. In another embodiment, the mobile device 102 is in wireless communication with the access point 122 via a short range communications medium or via 802.11x. Regardless of how the mobile device 102 communicates with the access point 122, the access point 122 can generate and send a membership_ID_request message 502 to the mobile device 102. The membership_ID_request message 502 can prompt the customer to enter a member ID to access the store network 106 and the customer's membership account. In embodiments that require security, a password, PIN, token, pass phrase, voice recognition, fingerprint recognition, retinal scan, security question(s), combinations thereof, and other security mechanism known in the art can be used to limit access to authorized customers.

In the illustrated process 500, the customer is prompted to enter a member ID and optional password. The customer can also be provided with a new membership button to create a new membership. A new membership registration process 400 is illustrated in FIG. 4. The customer can also be provided a lost membership_ID or lost password prompt to retrieve a forgotten or lost membership_ID and/or password. The customer can be emailed, called, or text messaged the lost information. In some instances, the customer can be required to create a new membership account. If a new membership account is needed, the previously described process 400 can be used to establish a new account for the customer.

After a member ID and password are entered, the mobile device 102 can generate and send a membership_ID_response message 504 to the access point 122. The membership_ID_response message 504 is received at the access point 122 and forwarded to the membership database 134. The membership database 134 receives the membership_ID_response message 504 and performs an ID authentication at step 506. If the authentication step 506 fails (not shown), a notification to this effect can be sent to the mobile device 102 to instruct the customer to take corrective action by reentering the correct membership_ID and optional password, or creating a new membership account, for example. If the authentication step 506 is successful, the customer is signed-in and, though not required, the membership database 134 can automatically generate and send a membership_sales_request message 508 to the sales database 132. The membership_sales_request message 508 can request any sales information currently available that is applicable to the customer. For example, available and applicable sales information can include daily, weekly, monthly, yearly, seasonal, holiday, promotional, individual store sales, clearance, red tag, member specific, member group specific, and membership level specific sales information, and the like. The membership_sales_information 510 can be sent to the mobile device 102 for access by the customer.

Figure 6:
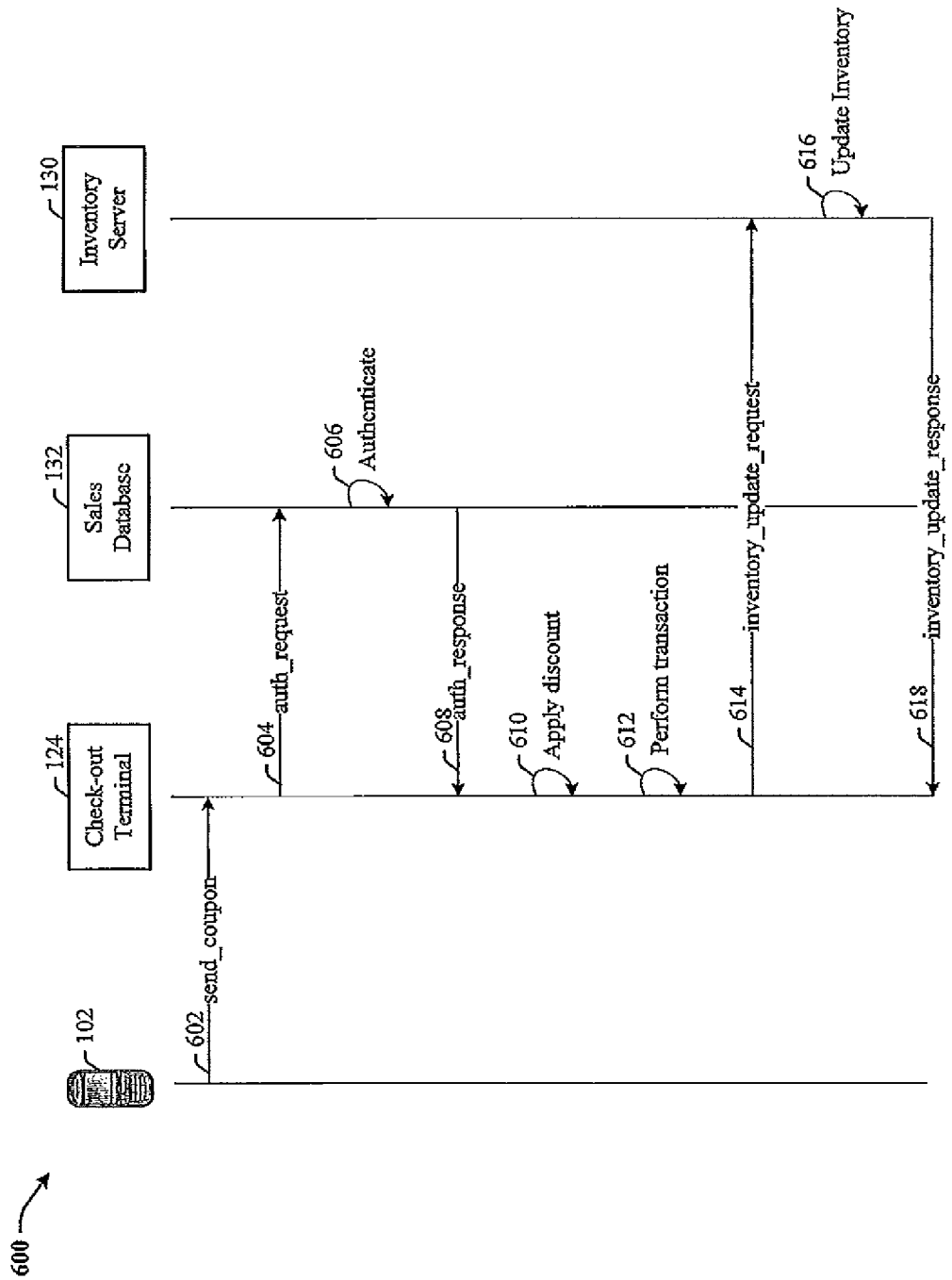
FIG. 6 is a message flow diagram illustrating a coupon redemption process in accordance with an embodiment of the present invention.

Referring now to FIG. 6, a message flow diagram illustrating a coupon redemption process 600, according to the present invention, is shown. The following description assumes that at least one digital coupon, e-coupon, promotion code, coupon code, or other electronic sale information has been stored in a memory 204 of the mobile device 102. This information can be acquired from the sales database 132 after a membership sign-in process 500, after a new membership registration process 400, or at any time as requested by the customer or directed by the store network 106, for example.

The coupon redemption process 600 begins when the mobile device 102 sends a coupon 602 to a check-out terminal 124. The coupon can be sent using wireline or wireless communication mediums via 802.11x, or a short communications medium as described above. In one embodiment, the mobile device 102 is connected to the check-out terminal 124 via a USB, IEEE 1394, Ethernet, or other wireline connection directly, or via a cradle apparatus. In another embodiment, the mobile device 102 is in communication with the check-out terminal 124 wireless via a short range communications medium or via 802.11x. Regardless of how the mobile device 102 and the check-out terminal 124 communicates, the check-out terminal 124 generates and sends an authentication_request message 604 to the sales database 132 to confirm and authenticate (606) the coupon. If the authentication step 606 fails (not shown), a notification to this effect can be sent to the mobile device 102 to notify the customer of the defective coupon. For example, the coupon may be expired or the incorrect item(s) were selected. If the authentication step 606 is successful, the sales database 132 can generate and send an authorization_response message 608 to the check-out terminal 124 indicating a successful authorization. The check-out terminal 124 can receive the authorization_response message 608 and can apply the coupon discount at step 610. The transaction is then performed at step 612. The check-out terminal 124 can generate and send an inventory_update_request message 614 to the inventory server 130. The inventory_update_request message 614 can include each item sold during the transaction. The inventory server 130 can update the inventory at step 616 and provide confirmation of a successful/failed update request in an inventory_update_response message 618 that is sent to the check-out terminal 124. Although illustrated as a message that is sent after each transaction, the check-out terminal 124 can send the inventory_update_request message 614 after each till exchange or cashier change to monitor associate performance, or on a periodic basis such as hourly, daily, weekly, monthly, or yearly, for example.

Figure 7:
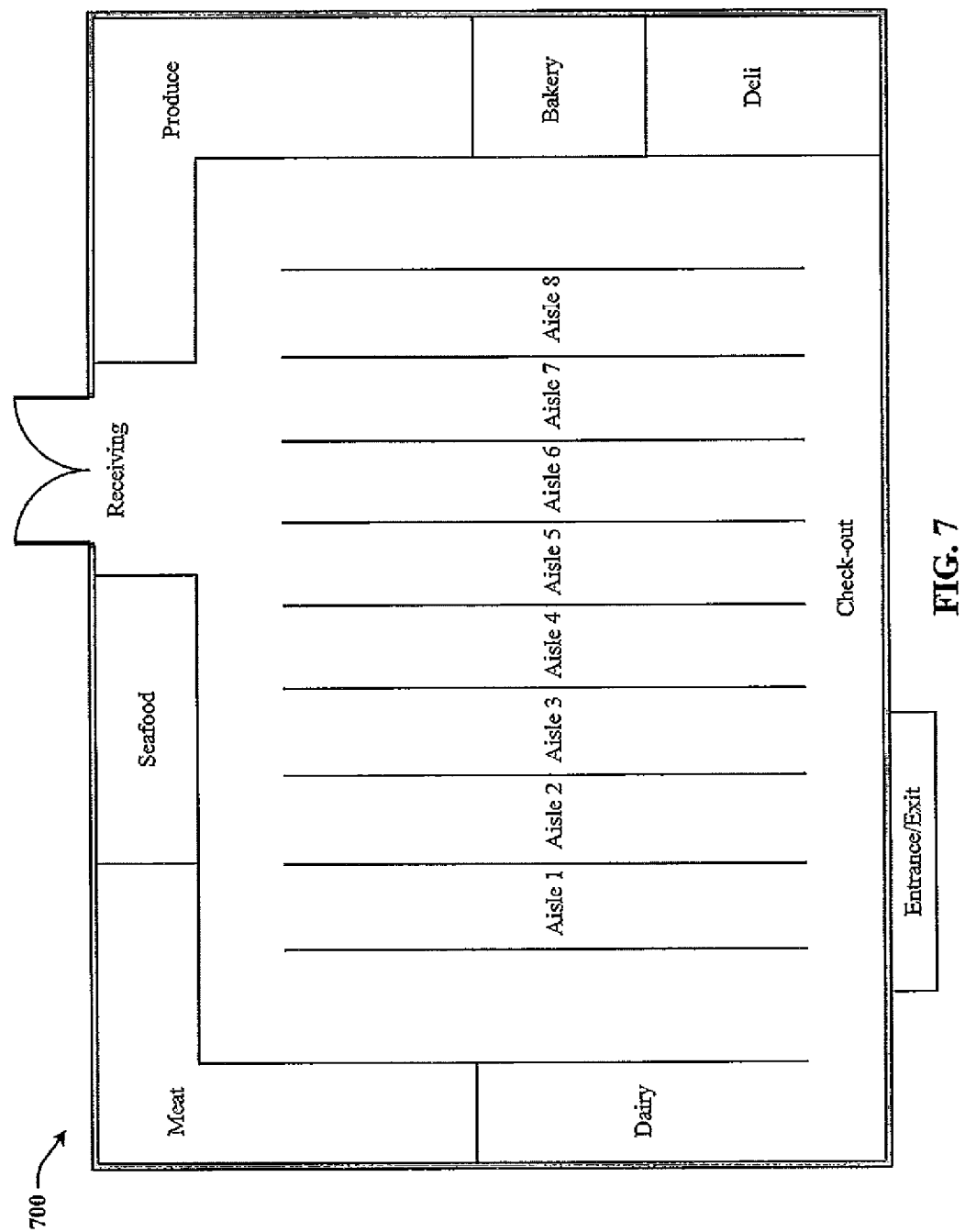
FIG. 7 is a diagram illustrating an exemplary store map in accordance with an embodiment of the present invention.

Referring now to FIG. 7, a diagram illustrating an exemplary store map 700 is shown. The store map 700 can be displayed on a mobile device display 200 to provide a store map view of various items on a customer's shopping list, or inquired about through a search function, for example. The store map view can also provide the customer's present location using location sensors distributed throughout the store. The illustrated store map 700 is for a grocery store and, as such, includes various departments common in a grocery store including a dairy department, a meat department, a seafood department, a receiving department, a produce department, a bakery department, and a deli department. The illustrated store map 700 also includes eight aisles for other goods sold in the store. It should be understood that the present invention is equally applicable to stores of other types including, but not limited to, electronics stores, department stores, book stores, pet stores, warehouse stores, tool stores, home improvement stores, car dealerships, video stores, video game stores, entertainment stores, sports equipment stores, clothing stores, specialty stores, and the like. The present invention is also applicable to museums, amusement parks, aquariums, zoos, monuments, art galleries, libraries, other consumer attractions, and the like.

Figure 8:
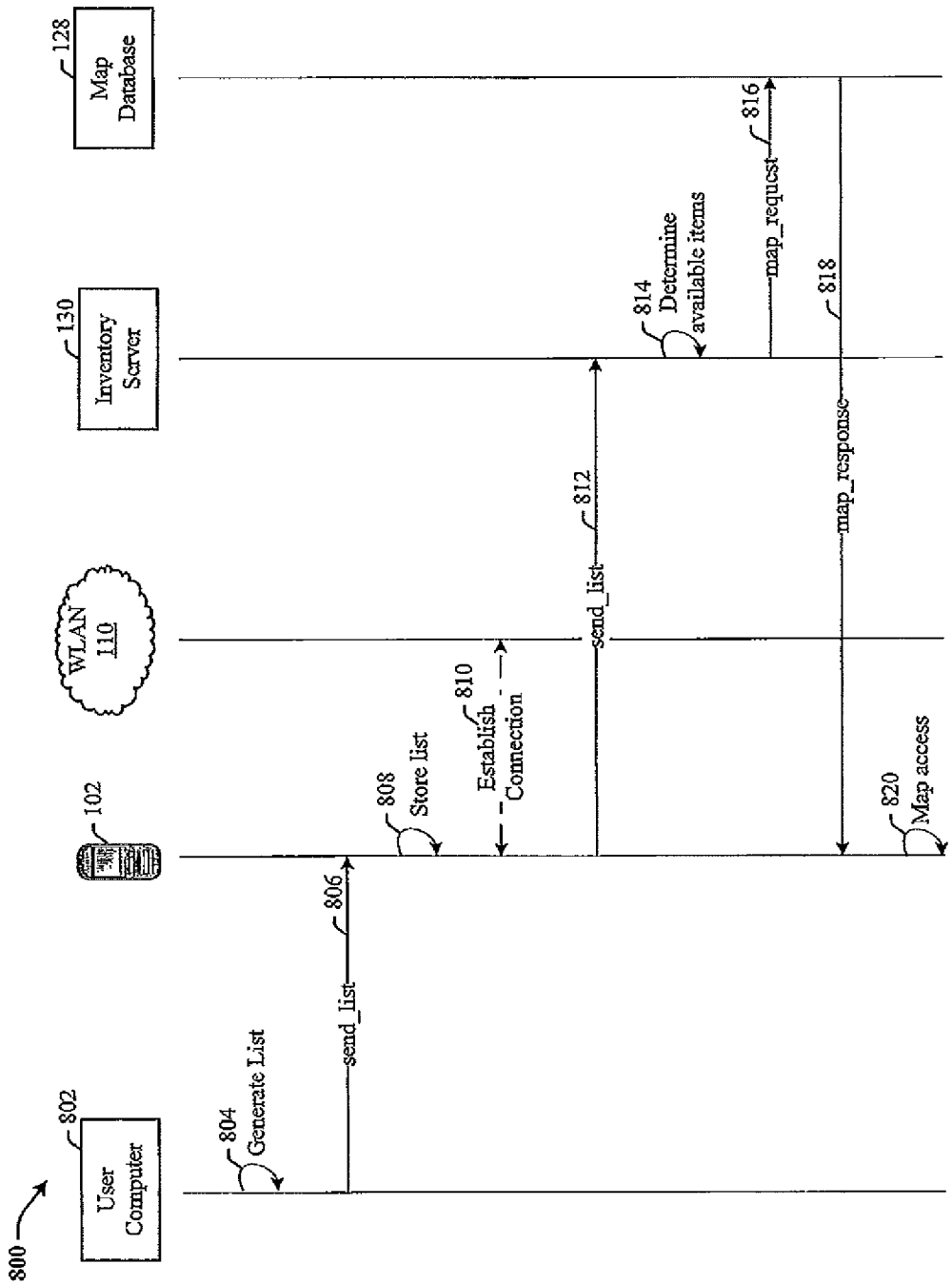
FIG. 8 is a message flow diagram illustrating a map list process in accordance with an embodiment of the present invention.

Referring now to FIG. 8, a message flow diagram illustrating a map list process 800, according to the present invention, is shown. The map list process 800 allows a user/customer to generate a shopping list on a user computer 802, and send the shopping list to a mobile device 102. The shopping list can be used at a store to retrieve map information for the store. The map information can include notations of where each item in the customer's list is located, and the customer's current location within the store. The list can be store specific or can include keywords that identify particular products by manufacturer and/or product type.

It is contemplated that the list can be created in a word processing program on the user computer 802, or can be created using a program specific to such a task. The mobile device 102 can include a program for viewing the list, editing a list, creating a list, and using the list to create a map of a store. The list can be created and saved with file extensions compatible with a store mapping system, and may not need to be further formatted by a user computer program or mobile device program. That is, an unformatted word processing file can be received as an input to a store mapping system, and the mapping system can create a map from the items listed in the file.

The illustrated map list process 800 begins at the user computer 802 when a user creates a list on user computer 802, at step 804. The list can be sent to the mobile device 102 in a send_list message 806. The list can be stored in a mobile device memory 204 at step 808. Upon entering a store premises, the mobile device 102 establishes a connection with the store network 106 via the WLAN 110, at step 810. The following assumes the customer has signed in to a membership account associated with the customer or created a membership account. The membership account can be subject to policies that allow the customer access to map functions, and prevent other members from accessing this function. The mobile device 102 transmits the stored list to the inventory server 130 in a send_list message 812. The inventory server 130 receives the send_list message 812 and can optionally determine the available items from the list, at step 814, by communications with the store network 106 devices (not illustrated). This can ensure that only in-stock items will be mapped so as not to mislead the customer. This step can be eliminated. A map_request message 816 can be generated and sent to the map database 128.

The map database 128, as described above, can include a plurality of maps for the store based on different store configurations. Upon receiving a map_request message 816, the map database 128 determines the appropriate map for the current store state. For example, a map can be labeled for use between certain dates and set to expire on or after a date. In addition, the map database 128 can generate a customized map for the available items and save the customized map as an image file, for example, prior to sending a map_response message 818 to the mobile device 102 with the customized map. In the illustrated embodiment, the mobile device 102 has image viewing capabilities and needs no additional program. In some alternative embodiments, the map database 128 can generate instructions based on the available items for use by a program installed on the mobile device 102. The mobile device processor 202 can execute the instructions to create a map for the available items. Though generating maps at a mobile device 102 may place further strain on the mobile device 102, it may reduce network congestion on the store network 106, and reduce the need for powerful processing requirements of the map database 128 and any associated systems/servers. In other alternative embodiments, the map database 128 can send a base map to a mobile device 102 upon registration of the mobile device 102 with the store network 106. This can also be accomplished by the map database 128 sending a version number of the current base map to the mobile device 102. The mobile device 102 can determine if the appropriate map is stored in memory 204. The map database 128 can also send a request for the version number of the current base map stored in the memory 204. If the version number is outdated, the map database 128 can send the current base map version to the mobile device 102 for storage in the memory 204. The mobile device 102 can be configured to create a map based on the list or a revised list based on the available items as determined by the inventory server 130.

Turning again to the illustrated process 800, the map database 128 can generate and send the map_response message 818 including the new map to the mobile device 102. The mobile device 102 can then access the map at step 820.

Referring now to FIG. 9, a message flow diagram illustrating a product search process 900, according to the present invention, is shown. The product search process 900 provides an item search function to a customer via a mobile device 102. The item search function allows a customer to search for items and request the item to be mapped or instructions provided on where to locate the item. The illustrated product search process 900 begins when the mobile device 102 establishes a connection with the WLAN 110 at step 902. The following assumes the customer has signed in to a membership account associated with the customer or created a membership account. The membership account can be subject to policies that allow the customer access to map functions, and prevent other members from accessing this function.

The mobile device 102 can initiate a search function at step 904 upon request by the customer. Upon initiation a search function, the customer can be prompted to enter a search string. The search string can be entered and the mobile device 102 generates and sends a search_request message 906 to the inventory server 130. The search_request message 906 can include the search string. The inventory server 130 can receive the search_request message 906 and determine if the requested item is available at step 908. If the item is not available, the inventory server 130 can generate a notification message to this effect and send the notification message to the mobile device 102 to notify the customer of the item status (not shown). If the item is available, the inventory database 130 can generate a map_request message 910, including the requested available item, and send the map_request message 910 to the map database 128. The map database 128 can receive the map_request message 910 and provide a map with the requested item and/or instructions for where to find the item in the store in a map_response message 912 sent to the mobile device 102. The mobile device 102 can then provide map access to the customer at step 914. Other methods for obtaining map information for the requested item on the mobile device 102 are contemplated for this process as well, as described above with reference to FIG. 8, for example.

Figure 10:
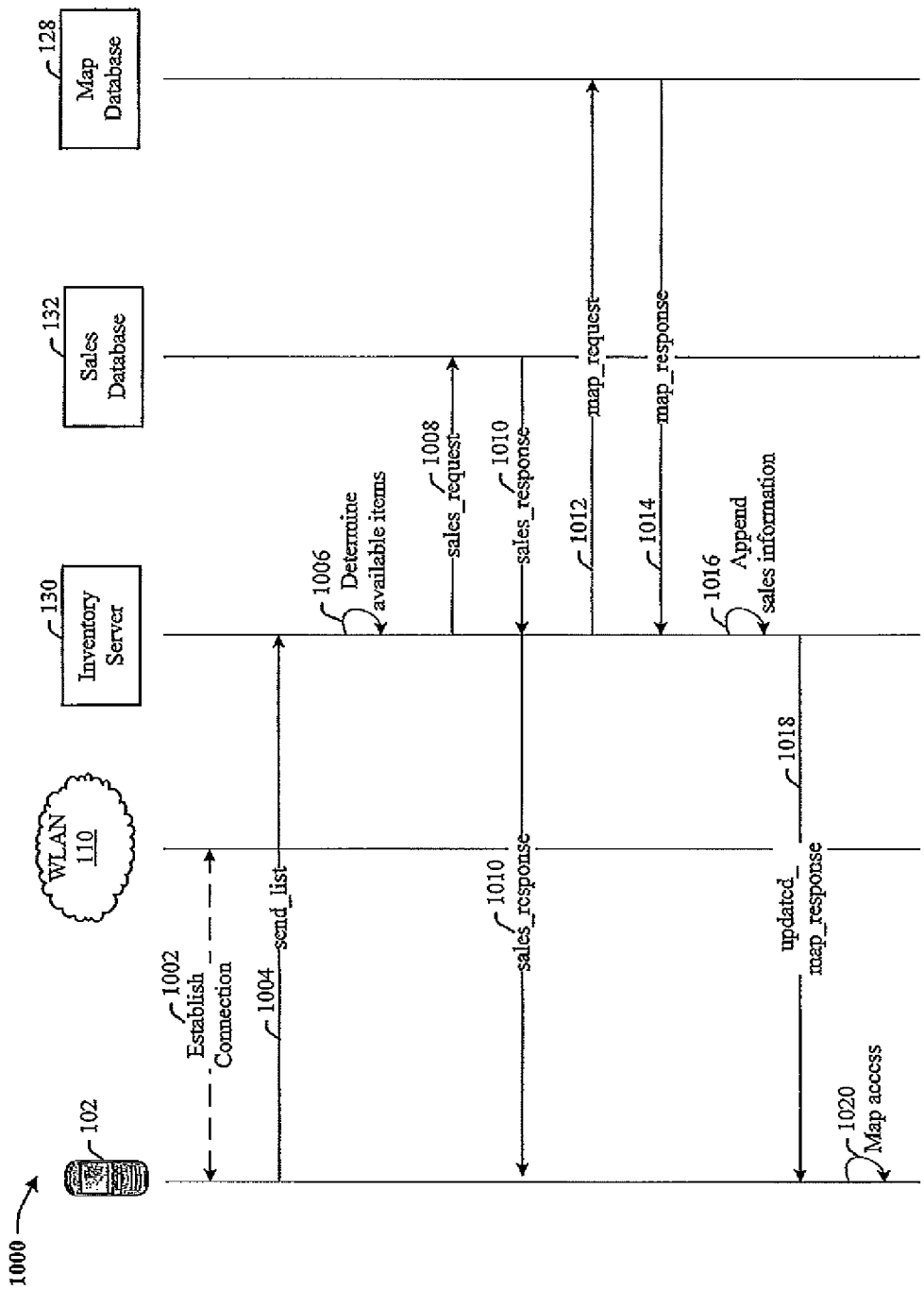
FIG. 10 is a message flow diagram illustrating a process for automatically providing sale information for a specified list of items in accordance with an embodiment of the present invention.

Referring now to FIG. 10, a message flow diagram illustrating a process 1000 for automatically providing sale information for a specified list of items, according to the present invention, is shown. The following description assumes that a list of items has been generated and is currently stored in a mobile device memory 204. The mobile device 102 establishes a connection with the WLAN 110, at step 1002. Alternatively, the mobile device 102 can connect to an access point 122 via 802.11x, a short range wireless communications medium, a wired connection, or a cradle connection, for example. Upon establishment of the connection, the mobile device 102 can send a send_list message 1004 to the inventory server 130. The send_list message 1004 includes the list of items for which the customer is requesting further information. It is contemplated that the mobile device 102 can include a program to facilitate a customer request for map information for an item map and/or a request for sale information current for the listed items. As an alternative to a customer request for sale information, the illustrated process 1002 can automatically request sale information for the available items on the customer's list.

Upon receipt of the send_list message 1004, the inventory server 130 determines the available items at step 1006. A revised list of available items is sent to the sales database 132 in a sales_request message 1008. The sales database 132 receives the sales_request message 1008 and searches for sales matching the requested items. A sales_response message 1010 is then generated, including an indication of no sale information, or the current sale information for the requested items. The sales_response message 1010 is then sent to the inventory server 130 and forwarded to the mobile device 102.

As an optional step, the inventory server 130 can generate a map_request message 1012 for all the listed items or a portion thereof, for example, the items that include sale information. The map_request message 1012 can be sent to the map database 128 to retrieve map information for the requested items. The map database 128 can provide the requested map information in a map_response message 1014 in any format as described above.

The inventory server 130 can append sales information upon receipt of the sales_response message 1010 at step 1016, and can generate an updated_map_response message 1018 that is sent to the mobile device 102 to inform the customer of the listed items that are on sale. It is contemplated that the customer's list can be updated with an indication on the device display 200 of the sale item as well as the sale price, any restrictions, and any combinable offers such as available coupons, for example. The customer can then access the map information at step 1020.

Figure 11:
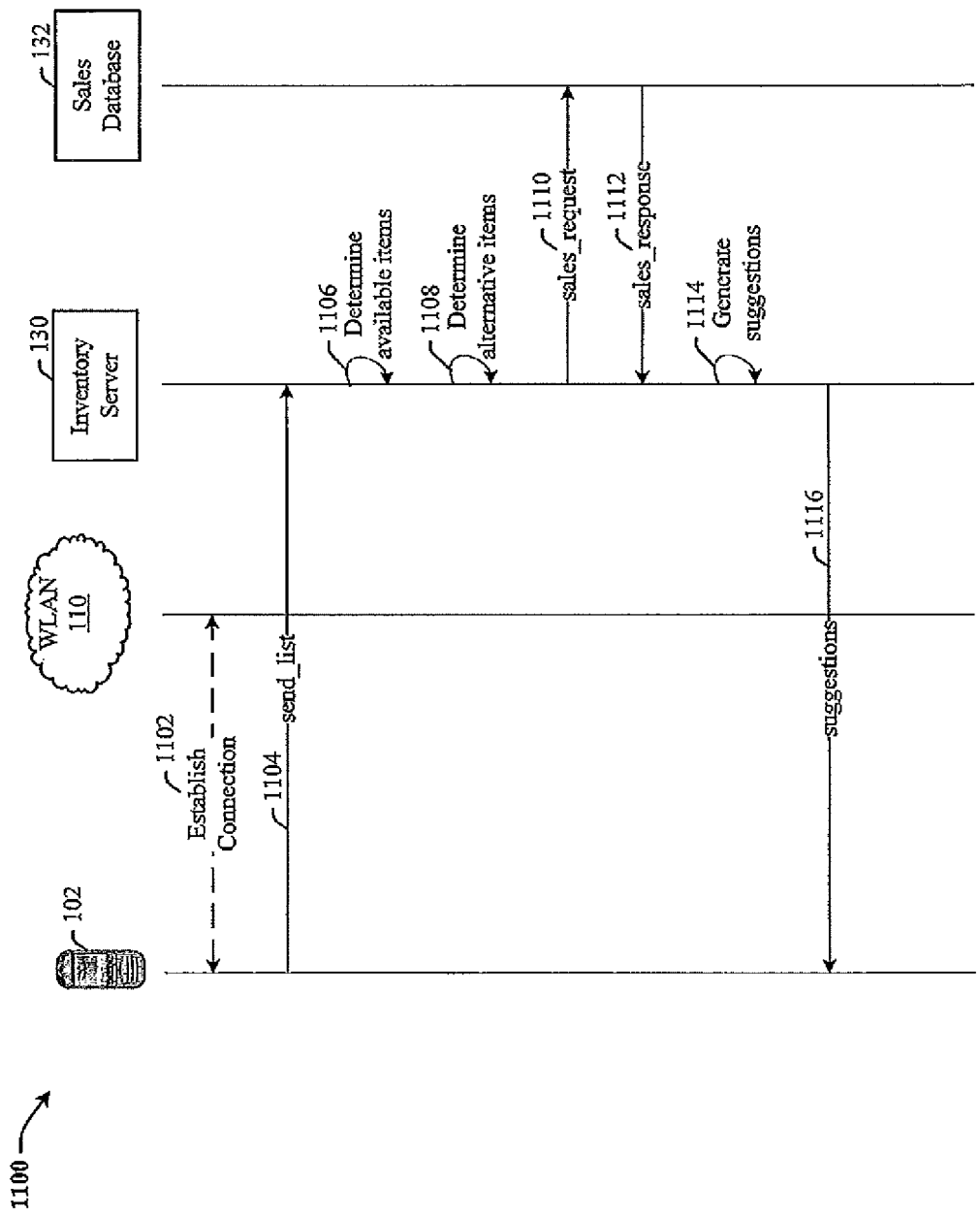
FIG. 11 is a message flow diagram illustrating a process for automatically recommending alternative items based upon item availability and/or current sale data in accordance with an embodiment of the present invention.

Referring now to FIG. 11, a message flow diagram illustrating a process 1100 for automatically recommending alternative items based upon item availability and/or current sale data, according to the present invention, is shown. The process 1100 begins when the mobile device 102 establishes a connection with the WLAN 110 at step 1102. Other connections as described above are also applicable. The mobile device 102 generates a send_list message 1104 that is sent to the inventory server 130. The inventory server 130 receives the send_list message 1104, extracts the customer's item list, and determines the available items, at step 1106. In some instances, one or more items will be unavailable and the inventory server 130 can determine if any items are available as suitable replacements for the requested item. Suitable replacements can be store brands or other lower cost alternatives, and other brands that are in stock to replace a requested brand item that is not in stock. These alternative items are determined at step 1108.

As an optional step, the inventory server 130 can generate a sales_request message 1110, and send the sales_request message 1110 to the sales database 132 to retrieve any sales information for the requested item(s). This can provide assurance to the customer that the suggested items are the most economical solution for the requested item. Items currently on sale via store sales, coupons, promotions, combinations thereof, and the like, can be determined at the sales database 132 for the requested items and sent back to the inventory server 130 in a sales_response message 1112. Any appropriate map can also be sent.

The inventory server 130 can include software to analyze the sales_response 1112 and generate suggestions based on the sales information provided by the sales database 132 at step 1114. The inventory server 130 can send the suggestions to the mobile device 102 in a suggestions message 1116. The suggestions message 1116 can be a text message notifying the customer of potential benefits (e.g., lower cost) for purchasing a suggested item over the item on the customer's list, for example. The suggestions message 1116 can also be used to manipulate the customer's list on the mobile device 102 to display the items originally listed by the customer, the store's suggestions, and any applicable coupons, coupon codes, promotion codes, or other information the customer would need to purchase the suggested items for the price offered.

Store suggestions can also be provided for related or similar items that are on a list but not co-located within the store. For example, one brand of an item may require refrigeration while all other brands do not require refrigeration. Accordingly, two locations offering similar items can be presented to the user for the user to select which location and which item the user would like to purchase. This selection can be used to generate an appropriate map including the selected location and may provide directions on where to find the item based upon the users present location within the store.

Figure 12:
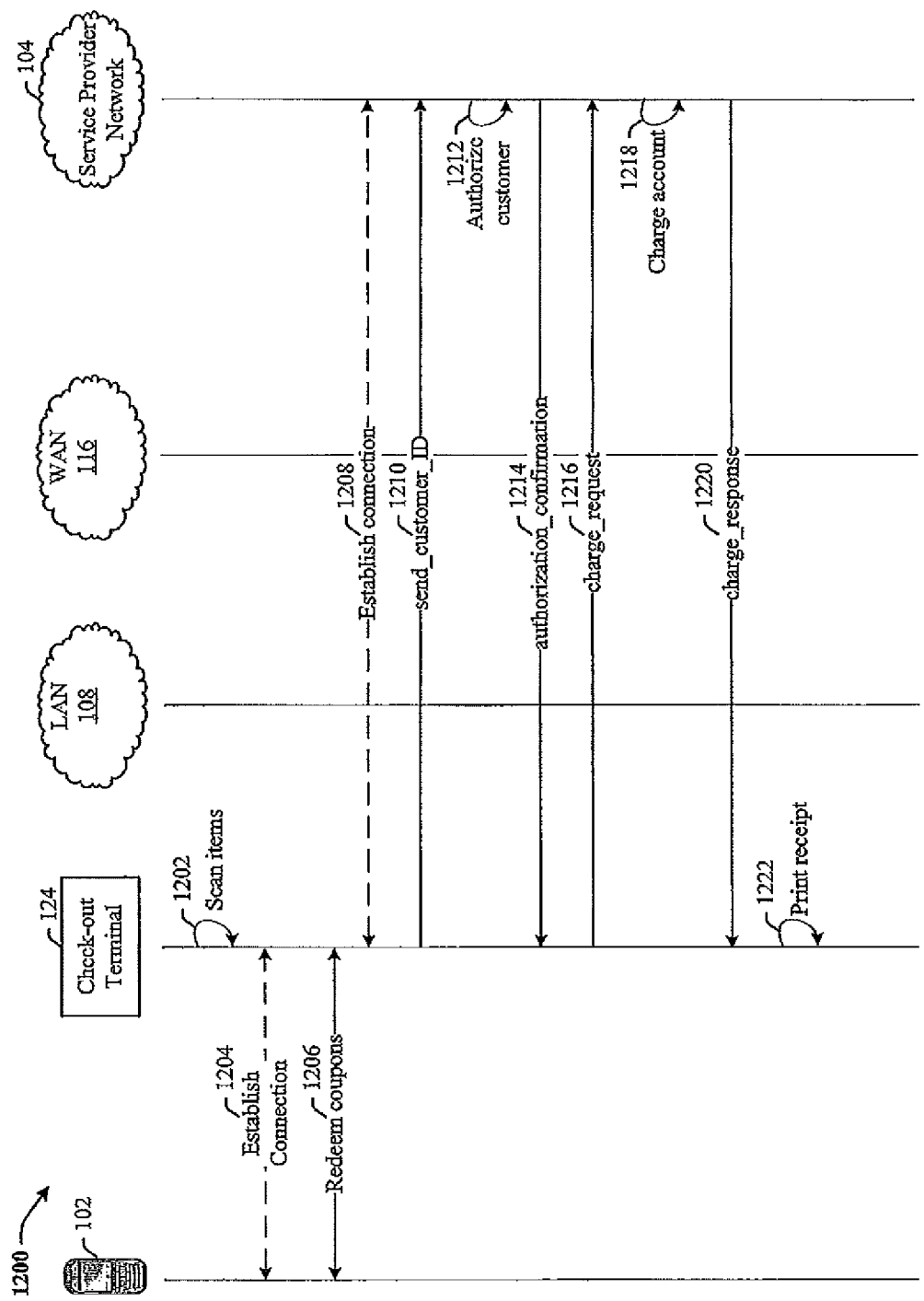
FIG. 12 is a message flow diagram illustrating a remote charging process in accordance with an embodiment of the present invention.

Referring now to FIG. 12, a message flow diagram illustrating a remote charging process 1200, according to the present invention, is shown. Remote charging allows a customer to charge purchases to a remote account such as, but not limited to, a wireless service account or any other account. In the illustrated example, the service provider network 104 is shown generically as a network cloud for purposes of simplicity. It should be understood, however, that the service provider network 104 includes billing systems required for billing postpaid customers and receiving pre-payment from prepaid customers for services rendered by the service provider.

In the illustrated example, remote charging allows a customer to charge items to the wireless account for payment at the end of a billing cycle. Limits can be imposed on the customer's wireless account and the customer can be required to pay a charge balance in full at the end of each billing period along with any wireless service charges for the billing period. Alternatively, the wireless service provider can provide a credit line to the customer based on credit contracts developed between the parties.

Points systems can also be implemented. For example, a customer can earn points for using the remote charging feature. The points can be redeemable for discounts, gift certificates, plane tickets, hotel rooms, car rentals, vacations, cruises, or other goods and services. In another example, a customer can purchase points that can be redeemed at brick and mortar or online stores. In this example, the store would offer point requirements for goods and services. A transaction involving points can be handled in a manner similar to that described and illustrated in FIG. 12.

A remote charging feature using a points system is particularly applicable to a scenario in which a family has a joint service plan, for example, with one or more children. Each child can be assigned an allowance as a one-time allocation of points or on a periodic (e.g., daily, weekly, monthly, etc.) basis. The child can then purchase items up to the available amount of points using a mobile device 102 at a check-out terminal 124.

An exemplary remote charging process 1200 is now described. The process 1200 begins when a customer approaches a check-out terminal 124. The check-out terminal 124 can be a self-checkout terminal or a check-out terminal operated by an associate. The check-out terminal 124 scans items at step 1202. The mobile device 102 can establish a connection with the check-out terminal 124 before, during, or after the items are scanned at step 1204. Once the connection is established, the mobile device 102 can transfer any digital coupons, e-coupons, coupon codes, promotion codes, or other sale information to the check-out terminal via a communications link established between the mobile device 102 and the check-out terminal 124 at step 1206. It is contemplated that the mobile device 102 can be configured to display the bar code, or other scannable format, of a coupon on the mobile device display 200 to be scanned by the scanning equipment for the check-out terminal 124. The mobile device 102 can communicate with the check-out terminal 124 via a direct wired connection, a cradle apparatus, or wirelessly through any short range wireless communications medium or 802.11x.

The check-out terminal 124 can present the customer with options on how to pay for the scanned items. For example, the customer can choose cash, credit card, debit card, check, traveler's check, gift certificate, government credit, and/or remote charge for some or all of the purchase. If the customer chooses an option other than remote charge, the transaction is handled as is known in the art. However, if the customer chooses remote charge, the check-out terminal 124 can establish a connection with the service provider network 104, at step 1208, to provide a customer ID in a send_customer_ID message 1210. The customer ID can be an identification provided by the service provider for the subscriber/customer. For example, the customer ID can be a telephone number or other subscriber ID provided by the service provider. The customer ID can also be of the customer's choosing, a member ID, or any other identification.

Upon receipt of the send_customer_ID message 1210, the service provider network 104 can perform an authorization step 1212 to authorize the customer's account. Authorization can require a security mechanism to authenticate the customer. For example, the security mechanism can be, but is not limited to, a PIN number, password, pass phrase, security question answer, and the like. In one example, the service provider network 104 can send a request for this information to the check-out terminal 124. The check-out terminal 124 can then request this information directly from the mobile device 102 without intervention of the customer. The check-out terminal 124 can alternatively request that the customer provide the requested information on a keypad or other input device connected to the check-out terminal 124. The check-out terminal 124 can also receive the requested information from the mobile device 102 upon entry by the customer via a keypad or other input device on the mobile device 102. The check-out terminal 124 can alternatively require the security information to be appended to the send_customer_ID message 1210 prior to being sent to the service provider network 104 to reduce transmissions between the service provider network 104 and the check-out terminal 124. Accordingly, the check-out terminal 124 can request that the security information be supplied by the customer via one of the aforementioned methods prior to generating and sending the send_customer_ID message 1210.

The authorization step 1212 can also verify if the customer's wireless account is setup for remote charging, and that the account is in good standing prior to finalizing the authorization. Upon proper authorization, the service provider network 104 generates and sends an authorization_confirmation message 1214 to the check-out terminal 124. If the authorization fails, the service provider network 104 can generate and send a notification to this effect to the check-out terminal 124 (not illustrated). The customer can then be notified accordingly.

The check-out terminal 124 can receive the authorization_confirmation 1214 and generate a charge_request message 1216 based on the amount the customer wishes to remotely charge to a service provider account, and send the charge_request message 1216 to the service provider network 104. The service provider network 104 can route the charge to the appropriate billing system (not shown) and charge the account appropriately at step 1218. A charge_response message 1220 can then be generated and sent to the check-out terminal 124 to verify that the charges were accepted. The check-out terminal 124 can then print a receipt at step 1222. The remote charging transaction is then complete.

Figure 13:
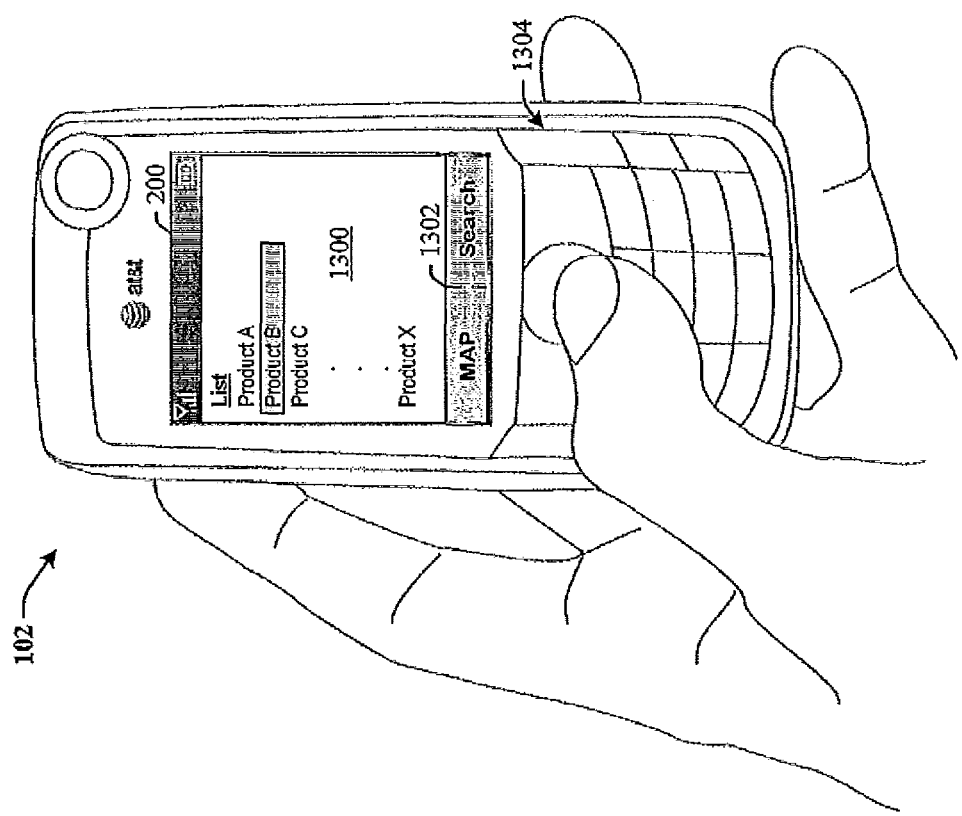
FIG. 13 is a diagram illustrating an exemplary mobile device on which an item list is displayed in accordance with an embodiment of the present invention.

FIG. 13 is a diagram illustrating an exemplary mobile device 102 on which an item list 1300 is displayed in accordance with an embodiment of the present invention. The illustrated mobile device 102 includes a display 200 on which the item list 1300 is displayed. The item list 1300 shows several products with Product B highlighted for selection via soft keys 1302 to engage either a Map function or a Search function. The soft keys 1302 can be programmed to engage any function or command. The mobile device 102 also includes a keypad 1304 input device for navigation of the item list 1300 and any menus or other features on the mobile device 102 that require a keypad 1304 or other input device. As described previously with reference to FIG. 2, the mobile device 102 can include any input mechanism and is not specifically limited to the illustrated keypad 1304. For example, the display 200 can also function as an input device.

Figure 14:
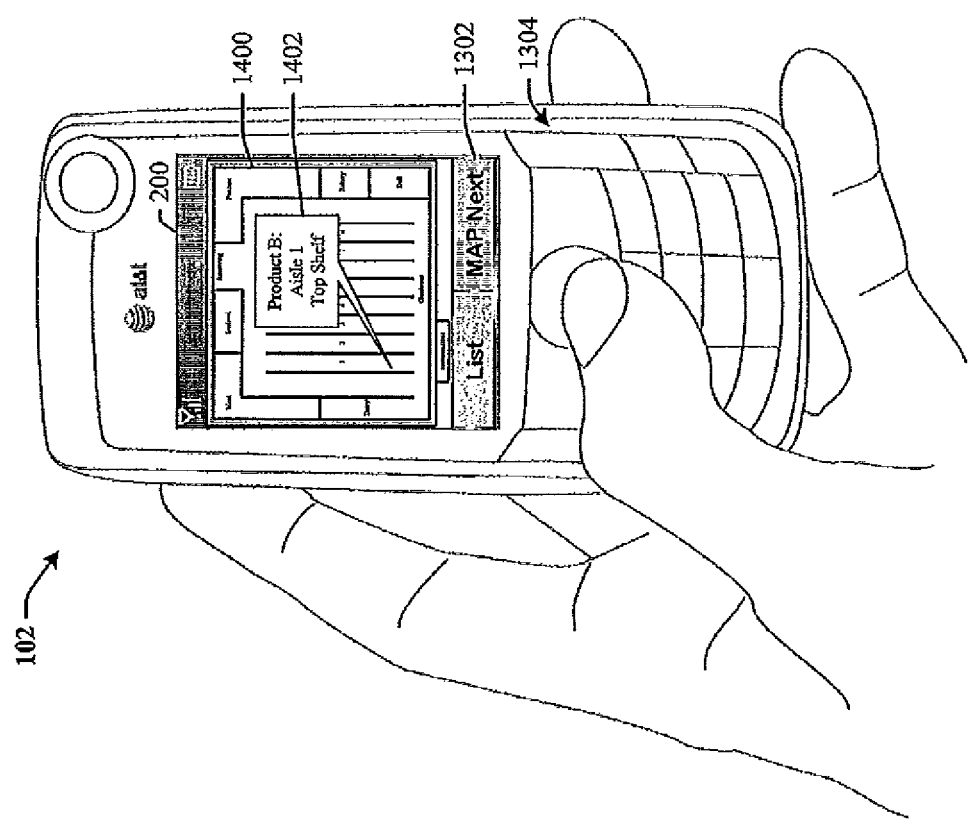
FIG. 14 is a diagram illustrating an exemplary mobile device on which a product map is displayed in accordance with an embodiment of the present invention.

FIG. 14 is a diagram illustrating an exemplary mobile device 102 on which a product map 1400 is displayed in accordance with an embodiment of the present invention. The product map 1400 includes a map of an example grocery store as illustrated in FIG. 7. The product map 1400 is displayed in response to a user selecting the Map function via the Map soft key shown in FIG. 13. The product location is provided by a call-out 1402 to the item location and a description of the item location. The illustrated embodiment shows merely one way in which this information can be displayed. It should be understood that the map and product location information can be displayed in any way.

It is contemplated that sensor networks, for example, sensor network 138 can also be used to provide approximate or exact locations for the products on the map in real-time or near real-time. The customer's location can also be tracked and displayed on the product map 1400.

The product location information can also layout the products in order of proximity to the customer's location such that the customer can quickly find and purchase each of the mapped items sequentially. A map displaying an appropriate in-store route can also be provided. For example, a map can be generated to include each item on a specified list and include a route providing the most efficient way to find the listed items. As each item is found, the user can manually confirm that the item was found. The item can be removed from the list and/or the map, or an indication can be provided to remind the user the item has been found.

As a user progresses through a store and selects mapped and/or listed items, those items can be automatically updated as found. For example, a sensor network 138 can be in place to update the list and/or map upon an item being placed in the user's shopping cart or shopping basket. Each shopping cart or shopping basket can provide content updates to the mobile device 102 to correlate shopping cart contents with a list and/or map on the mobile device 102 and make adjustments accordingly. The shopping cart or shopping basket can also be in communication with the inventory server 130 to temporarily adjust the stock status for the items and can be used to generate a pre-checkout list.

Figure 15:
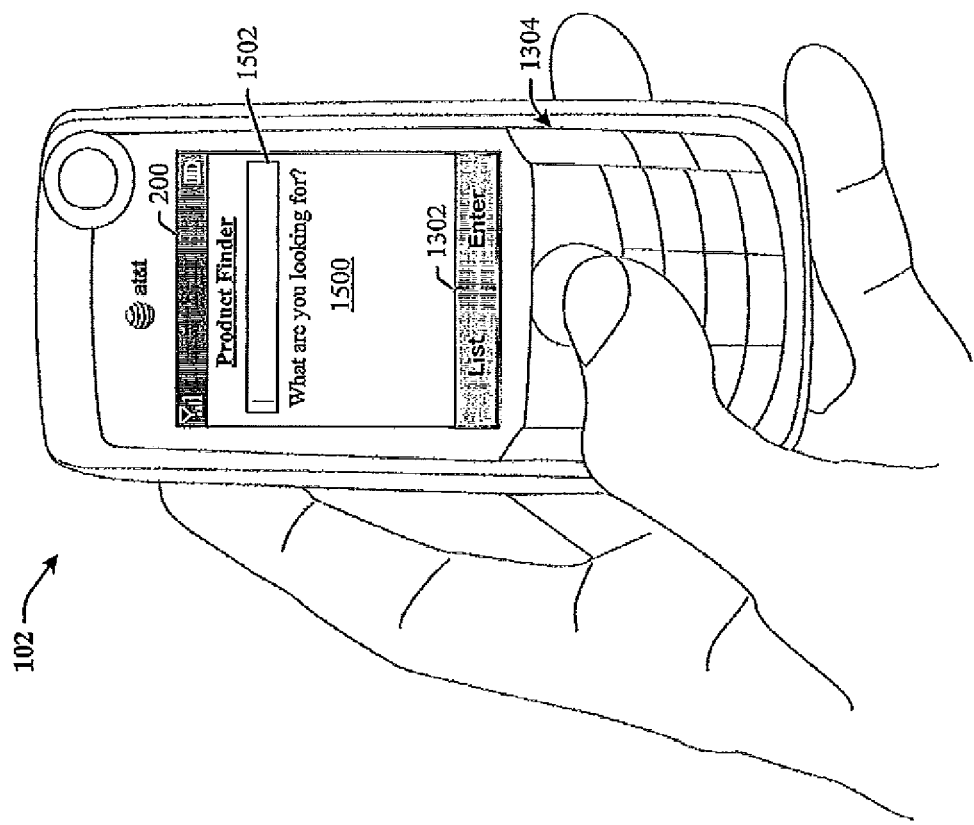
FIG. 15 is a diagram illustrating an exemplary mobile device on which a product search is displayed in accordance with an embodiment of the present invention.

FIG. 15 is a diagram illustrating an exemplary mobile device 102 on which a product search 1500 is displayed in accordance with an embodiment of the present invention. The product search 1500 is displayed in response to a user selecting the Search function via the Search soft key shown in FIG. 13. The user can enter a search string in the search box 1502 and select the Enter soft key to engage a search function for the entered string. An exemplary search process 900 is described with reference to FIG. 9.

An item list can include supplemental features such as a calculator and a priority assignment feature. The calculator can keep track of list cost based on previous prices or prices provided to the mobile device 102 in real-time or near real-time in communications with the store network 106. The store network 106 can supply related sales information and recalculate the new cost and/or provide suggestions to keep costs below a limit. The calculator can also provide suggestions for potential savings in purchasing one product over another. This information can be retrieved from the store network 106.

The item list can allow a customer to assign priority for items. The items can be arranged in the list according to the priority set for each item. If a limit is set, the list can highlight the items that would best utilize the funds for the set limit based on the priority set for each item. The customer can assign a favorites tag to items.

An archive item list can also be tracked and periodically updated. The archive list can maintain prices, sales, coupons, and other information for each item placed on a customer's list in a specified time period. The customer can view recent lists, most purchased items, favorite items, least purchased items, items suggested by the customer, items suggested by the store, items suggested by a friend, items to avoid, and other item categories.

The store network 106 can also provide recipe suggestions to the customers. A recipe suggestion can be based on one or more items in a customer item list and sale items, for example.

Item lists, maps, product reviews, member IDs, passwords, remote charge customer ID, recipes, and other information related to the present invention can be exchanged between mobile devices. A SIM or USIM can be configured to store at least a portion of this information and can be transferred to another mobile device.

Item lists can also be filtered based upon the store type a customer enters. For example, the customer can create a list including every item the user needs to purchase including groceries and clothing. Upon entry into a super store that includes both groceries and clothing, the list can be presented to the customer as created. However, if the customer enters a grocery store, for example, the items not available at that store can be grayed out or otherwise made unavailable to the user. This can be accomplished by communication between the mobile device 102 and the store inventory server 130, for example.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method comprising:
receiving, at a server comprising a processor, a request from a mobile device for map information indicating a location of an item within a store;
determining availability of the item;
sending an availability status of the item to the mobile device; and
if the server determines that the item is available,
retrieving, by the server, the map information that indicates the location of the item within the store, and
determining a present location of the mobile device, generating directions from the present location of the mobile device to the location of the item within the store, and sending, by the server, the directions to the mobile device.

2. The method of claim 1, wherein the map information comprises a base map and a data point for the item.

3. The method of claim 1, wherein the map information comprises a custom map with a location notation established for the item.

4. The method of claim 1, wherein the map information comprises a map version number of a map stored in a memory of the mobile device.

5. The method of claim 1, wherein the request from the mobile device includes an item list.

6. The method of claim 1, wherein the server is in a store network.

7. The method of claim 1, further comprising:

if the server determines that the item is not available, determining alternative item information for the item, and sending the alternative item information to the mobile device.

8. A device comprising:

a processor; and a memory that stores instructions which, when executed by the processor, cause the processor to perform operations comprising receiving a request from a mobile device for map information indicating a location of an item within a store, determining availability of the item, sending an availability status of the item to the mobile device, and if the item is determined to be available, retrieving the map information that indicates the location of the item within the store, determining a present location of the mobile device, generating directions from the present location of the mobile device to the location of the item within the store, and sending the directions to the mobile device.

9. The device of claim 8, wherein the map information comprises a base map and a data point for the item.

10. The device of claim 8, wherein the map information comprises a custom map with a location notation established for the item.

11. The device of claim 8, wherein the map information comprises a map version number of a map stored in a memory of the mobile device.

12. The device of claim 8, wherein the request from the mobile device includes an item list.

13. The device of claim 8, wherein the request is received from the mobile device, and the map information is sent to the mobile device, via a store network.

14. The device of claim 8, wherein the operations further comprise:

if the server determines that the item is not available, determining alternative item information for the item, and sending the alternative item information to the mobile device.

15. A non-transitory computer-readable storage medium comprising computer-executable instructions which, when executed by a processor, cause the processor to perform operations comprising:

receiving a request from a mobile device for map information indicating a location of an item within a store;

determining availability of the item;

sending an availability status of the item to the mobile device; and if the server determines that the item is available, retrieving the map information that indicates the location of the item within the store, determining a present location of the mobile device, generating directions from the present location of the mobile device to the location of the item within the store, and sending the directions to the mobile device.

16. The non-transitory computer-readable storage medium of claim 15, wherein the map information comprises a base map and a data point for the item.

17. The non-transitory computer-readable storage medium of claim 15, wherein the map information comprises a custom map with a location notation established for the item.

18. The non-transitory computer-readable storage medium of claim 15, wherein the operations further comprise:

if the server determines that the item is not available, determining alternative item information for the item, and sending the alternative item information to the mobile device.

* * * * *